(12) United States Patent
Miesak

(10) Patent No.: US 8,774,613 B1
(45) Date of Patent: Jul. 8, 2014

(54) LATENT FINGERPRINT IMAGING SYSTEM

(71) Applicant: Lockheed Martin Corporation, Bethesda, MD (US)

(72) Inventor: Edward J. Miesak, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/210,996

(22) Filed: Mar. 14, 2014

Related U.S. Application Data

(63) Continuation-in-part of application No. 13/888,264, filed on May 6, 2013, which is a continuation-in-part of application No. 13/049,351, filed on Mar. 16, 2011, now Pat. No. 8,437,517, application No. 14/210,996, filed on Mar. 14, 2014, which is a continuation-in-part of application No. 13/776,219, filed on Feb. 25, 2013.

(60) Provisional application No. 61/409,753, filed on Nov. 3, 2010, provisional application No. 61/602,956, filed on Feb. 24, 2012, provisional application No. 61/606,898, filed on Mar. 5, 2012.

(51) Int. Cl.
*G03B 29/00* (2006.01)
*G06K 9/74* (2006.01)
*F21V 7/00* (2006.01)
*H04N 5/30* (2006.01)
*G06K 9/00* (2006.01)

(52) U.S. Cl.
CPC .............. *G06K 9/00013* (2013.01); *H04N 5/30* (2013.01)
USPC ................ 396/15; 356/71; 362/343; 362/346

(58) Field of Classification Search
USPC .......................................................... 396/15
See application file for complete search history.

(56) References Cited

U.S. PATENT DOCUMENTS

| 4,120,585 A | 10/1978 | DePalma et al. |
| 4,783,167 A | 11/1988 | Schiller et al. |

(Continued)

FOREIGN PATENT DOCUMENTS

| CN | 2603449 | 2/2004 |
| CN | 201210214 | 3/2009 |

(Continued)

OTHER PUBLICATIONS

Williams et al., "Analysis of Latent Fingerprint Deposits by Infrared Microspectroscopy," Applied Spectroscopy, Nov. 3, 2004, pp. 313-316, vol. 58, Counterterrorism and Forensic Science Research Unit, FBI Academy, Quantico, VA 22135.

*Primary Examiner* — WB Perkey
(74) *Attorney, Agent, or Firm* — Terry M. Sanks, Esq.; Beusse Wolter Sanks & Maire, P.A.

(57) ABSTRACT

This document relates to a latent fingerprint imaging system. The system includes a light source that illuminates a sample surface having a raw latent fingerprint. The system further includes an optical detector arranged to capture fluorescence instantaneously from gap portions of the sample surface between ridges of the latent fingerprint and use the fluorescence from the gap portions to generate image data of the latent fingerprint on the sample surface. The light from the light source has a wavelength that is greater than a propagation threshold wavelength so the light can propagate from the light source to the sample surface and is less than an absorption threshold wavelength so the light is mostly absorbed by material of the latent fingerprint.

20 Claims, 5 Drawing Sheets

(56) References Cited

U.S. PATENT DOCUMENTS

| | | | |
|---|---|---|---|
| 4,785,171 A | 11/1988 | Dowling et al. | |
| 5,109,427 A | 4/1992 | Yang | |
| 5,210,588 A | 5/1993 | Lee | |
| 5,233,404 A | 8/1993 | Lougheed et al. | |
| 5,313,265 A | 5/1994 | Hayes et al. | |
| 5,737,071 A * | 4/1998 | Arndt | 356/71 |
| 5,812,252 A | 9/1998 | Bowker et al. | |
| 5,867,329 A | 2/1999 | Justus et al. | |
| 5,896,189 A | 4/1999 | Watkins | |
| 5,963,657 A | 10/1999 | Bowker et al. | |
| 6,076,942 A | 6/2000 | Brandt | |
| 6,115,484 A | 9/2000 | Bowker et al. | |
| 6,643,390 B1 | 11/2003 | Clark et al. | |
| 6,665,427 B1 | 12/2003 | Keagy et al. | |
| 6,668,071 B1 | 12/2003 | Minkin et al. | |
| 6,998,623 B2 | 2/2006 | Usami et al. | |
| 7,783,178 B2 | 8/2010 | Liu | |
| 8,437,517 B2 * | 5/2013 | Miesak et al. | 382/124 |
| 2002/0118962 A1 | 8/2002 | Takahara et al. | |
| 2004/0136057 A1 | 7/2004 | Veith et al. | |
| 2011/0076383 A1 | 3/2011 | Reedy et al. | |
| 2011/0176205 A1 | 7/2011 | Shaw et al. | |
| 2013/0223832 A1 * | 8/2013 | Miesak | 396/200 |

FOREIGN PATENT DOCUMENTS

| | | |
|---|---|---|
| JP | H06147852 | 5/1994 |
| JP | 2001034738 | 2/2001 |

* cited by examiner

LATENT FINGERPRINT IMAGING SYSTEM

CROSS REFERENCE TO RELATED APPLICATIONS

This application is a Continuation-In-Part of U.S. application Ser. No. 13/888,264 filed on May 6, 2013, which in turn is a Continuation of U.S. application Ser. No. 13/049,351 filed Mar. 16, 2011, now issued as U.S. Pat. No. 8,437,517 on May 7, 2013, which claims the benefit of U.S. Provisional Application No. 61/409,753 filed Nov. 3, 2010, all herein incorporated by reference in their entirety. This application is also a Continuation-In-Part of U.S. application Ser. No. 13/776,219 filed Feb. 25, 2013, which claims the benefit of U.S. Provisional No. 61/602,956 filed Feb. 24, 2012, and U.S. Provisional No. 61/606,898 filed Mar. 5, 2012, the entire contents of which are hereby incorporated by reference.

Development was supported in part by Contract No. W911NF-10-C-0029, awarded by the United States Department of Army. Accordingly, the United States Government may have certain rights.

FIELD

Disclosed embodiments relate to non-contact optical imaging of latent fingerprints.

BACKGROUND

Latent prints are invisible fingerprint impressions left on solid surfaces following surface contact caused by the perspiration on the ridges of an individual's skin on their fingers coming in contact with a surface and leaving perspiration behind, making an impression on it. Such fingerprint impressions may include substances like water, salt, amino acids, oils and also grime and various substances a person may have on their fingertip(s) or that may be present on a surface and able to accept an impression.

Conventional methods for extracting fingerprints usually involve adding chemicals or powders to the print. Such conventional methods can present an immediate dilemma in that they force the investigator to make a decision as to whether to dust for prints versus swabbing for DNA or chemical evidence present in the makeup of the print. Furthermore, such conventional methods are time-consuming and inconsistent, requiring some amount of trial-and-error on the part of an investigator before finding technique suitable for a particular fingerprint composition and fingerprint-bearing surface combination.

Automatic non-contact latent fingerprint detection systems are also known that avoid the need to add chemicals or powders that can disturb the surface chemicals of the fingerprint. Such systems generally include a single light source, which illuminates the surface with the latent fingerprint. However, these systems use light having a wavelength which does not optimize the contrast of the fingerprint image, among other disadvantages.

SUMMARY

Disclosed embodiments may include a latent fingerprint imaging system. The system may include a light source that illuminates a sample surface having a raw latent fingerprint, where the sample surface is at an ambient temperature. The system may further include an optical detector arranged relative to the light source to capture fluorescence instantaneously from gap portions of the sample surface between ridges of the latent fingerprint upon illumination of the sample surface at the ambient temperature and uses the fluorescence from the gap portions to generate image data of the latent fingerprint on the sample surface. The system may further include an image processor that analyzes the generated image data to verify that a contrast of the image data exceeds a minimum contrast threshold. The light from the light source has a wavelength that is greater than a propagation threshold wavelength such that the light is configured to propagate from the light source to the sample surface. Additionally, the light wavelength is less than an absorption threshold wavelength such that the light is mostly absorbed by material of the latent fingerprint on the sample surface.

Disclosed embodiments may further include a latent fingerprint imaging system that includes a light source configured to output light with a wavelength that is greater than a propagation threshold wavelength such that the light can propagate a maximum distance and less than an absorption threshold wavelength such that most of the light is absorbed by fingerprint material. The light source may be positioned to illuminate a sample surface having a raw latent fingerprint, where the sample surface is separated from the light source by a distance that is less than the maximum distance. The system may further include an optical detector arranged relative to the light source such that the optical detector captures fluorescence from gap portions of the sample surface between ridges of the latent fingerprint and uses the fluorescence of the gap portions to generate image data of the latent fingerprint on the sample surface.

Disclosed embodiments may further include a method for imaging latent fingerprints. The method may start by outputting light from a light source with a wavelength that is greater than a propagation threshold wavelength such that the light can propagate a maximum distance and less than an absorption threshold wavelength such that most of the light is absorbed by fingerprint material. The method may further include positioning the light source to be separated by less than the maximum distance from a sample surface at an ambient temperature and having a raw latent fingerprint. The method may further include illuminating the sample surface and the fingerprint with the light. The method may further include instantaneously capturing fluorescence from gap portions of the sample surface between ridges of the latent fingerprint with an optical detector. The method may further include using the fluorescence to generate image data of the latent fingerprint on the sample surface.

BRIEF DESCRIPTION OF THE DRAWINGS

The embodiments will become more fully understood from the detailed description given hereinbelow and the accompanying drawings which are given by way of illustration only, and thus are not limitative of the embodiments, and wherein.

DETAILED DESCRIPTION

Figure 1:
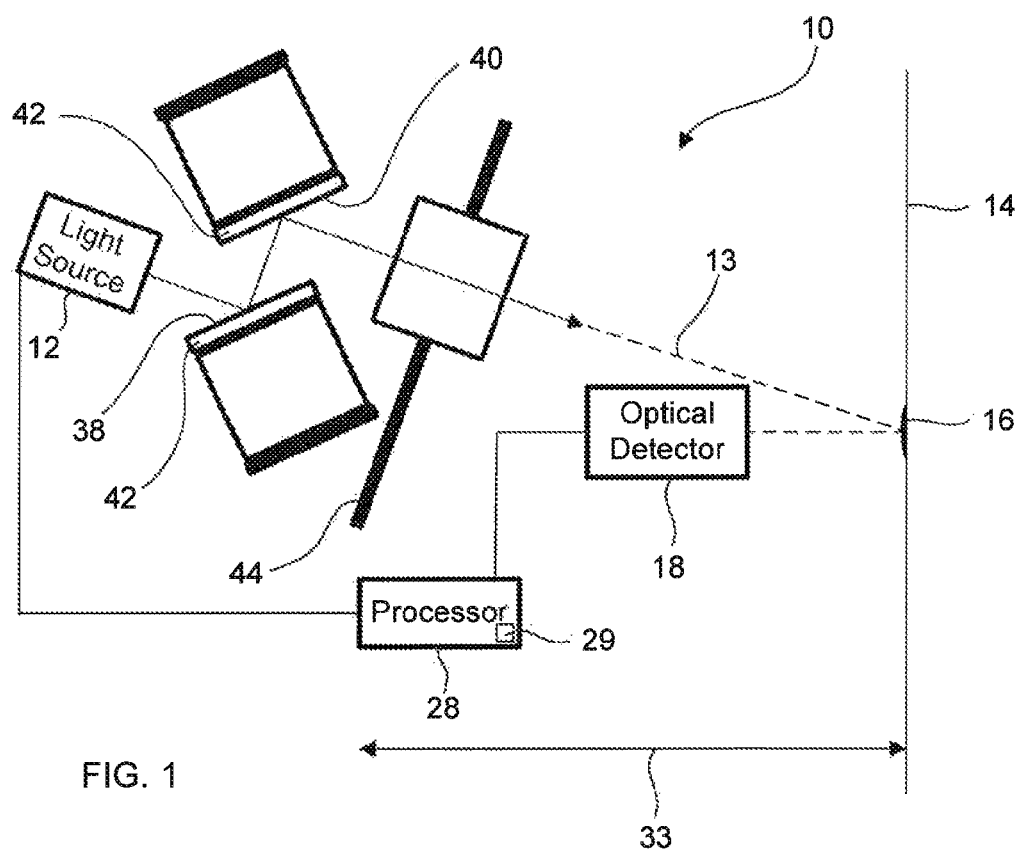
FIG. 1 is a schematic view of a fingerprint imaging system as described herein.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

FIG. 1 illustrates a latent fingerprint imaging system 10, that may include a light source 12 that illuminates a sample surface 14 on which a raw latent fingerprint 16 is positioned. The raw latent fingerprint 16 on the sample surface 14 may be an unprocessed, unrefined and/or untreated fingerprint on the sample surface 14. In a non-limiting example, the raw fingerprint 16 material and the sample surface 14 are at an ambient temperature prior to, during and subsequent to the operation of the system 10. The system 10 may further include an optical detector 18 arranged relative to the light source 12 to capture image data of the sample surface 14 in order to generate an image of the latent fingerprint 16 on the sample surface 14. As shown in FIG. 1, the optical detector 18 may be aligned approximately normal to the sample surface 14 and the light source 12 is aligned at a non-normal angle to the sample surface 14. In a non-limiting example, the optical detector 18 may be aligned within a range of 80-100 degrees, relative to the sample surface 14. Additionally, an image processor 28 may be connected to the light source 12 and the optical detector 18, to perform various control functions of the light source 12 and the optical detector 18, in order to illuminate the sample surface 14 with the light source 12 and capture an image of the fingerprint 16 on the sample surface 14. In a non-limiting example, the system 10 need not be arranged in this specific manner, and the optical detector 18 may be aligned at a non-normal angle to the sample surface 14 while the light source 12 may be aligned at a normal angle to the sample surface 14. Additionally, although the illustrated embodiment of FIG. 1 depicts that the light source 12 is a flash lamp, the light source 12 is not limited to this source and may be a laser, as discussed in greater detail below.

Figure 2:
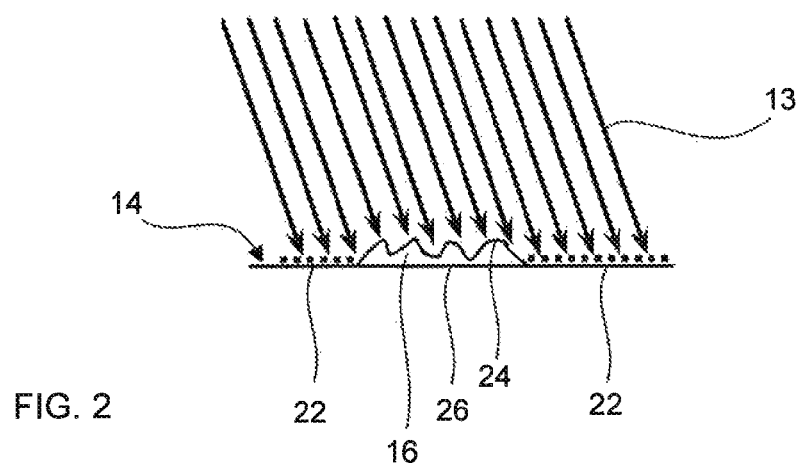
FIG. 2 is a cross-sectional view of a sample surface of the fingerprint imaging system of FIG. 1.

As further illustrated in FIG. 1, the system 10 may include a pair of mirrors 38, 40 each with a reflective coating 42 to reflect light 13 from the light source 12 and filter out specific wavelengths of the light 13, as discussed in greater detail below. Additionally, the system 10 may include a baffle 44 to reduce scattering and collimate the filtered light 13 from the mirrors 38, 40 incident on the sample surface 14. FIG. 2 illustrates the sample surface 14 with the latent fingerprint 16 along the surface 14. As illustrated in FIG. 2, the sample surface 14 may include gap portions 22 between ridges 24 of the fingerprint 16 and the sample surface 14 also includes ridge portions 26 beneath the ridges 24 of the fingerprint 16. As discussed in greater detail below, the coating 42 of the mirrors 38, 40 may be designed to filter the wavelength of the light 13 so that the light 13 is absorbed by the fingerprint 16 material. Thus, the gap portions 22 of the sample surface 14 may absorb the incident light 13 and fluoresces at a wavelength detected by the optical detector 18, while the ridge portions 26 do not absorb the incident light 13 (absorbed by ridges 24 of the fingerprint 16 material) and thus do not fluoresce. The optical detector 18 thus detects an image contrast between the gap portions 22 and the ridges 24 of the fingerprint 16.

Figure 3A:
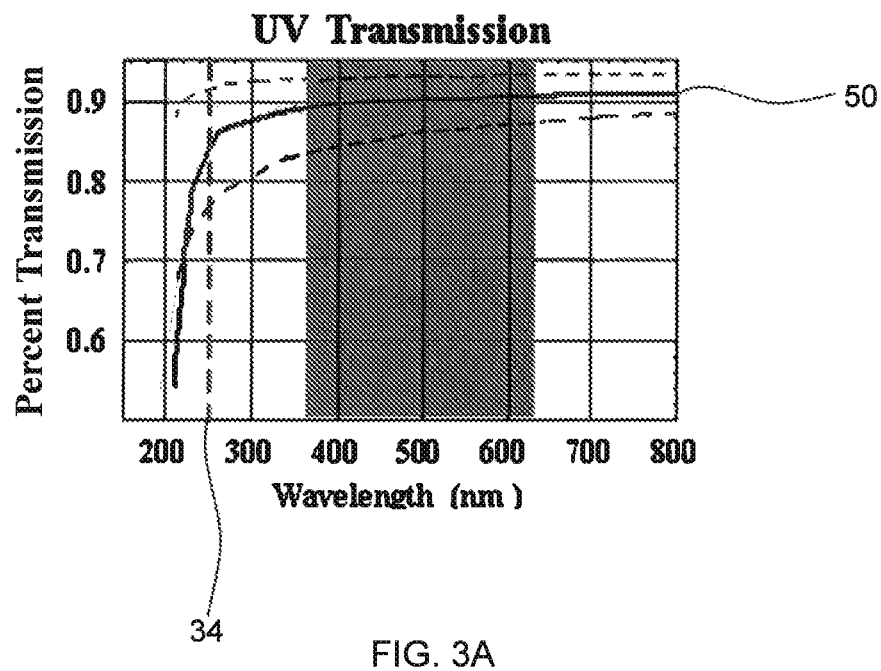
FIG. 3A is a plot of UV Transmission percentage versus wavelength for fingerprint material.
Figure 3B:
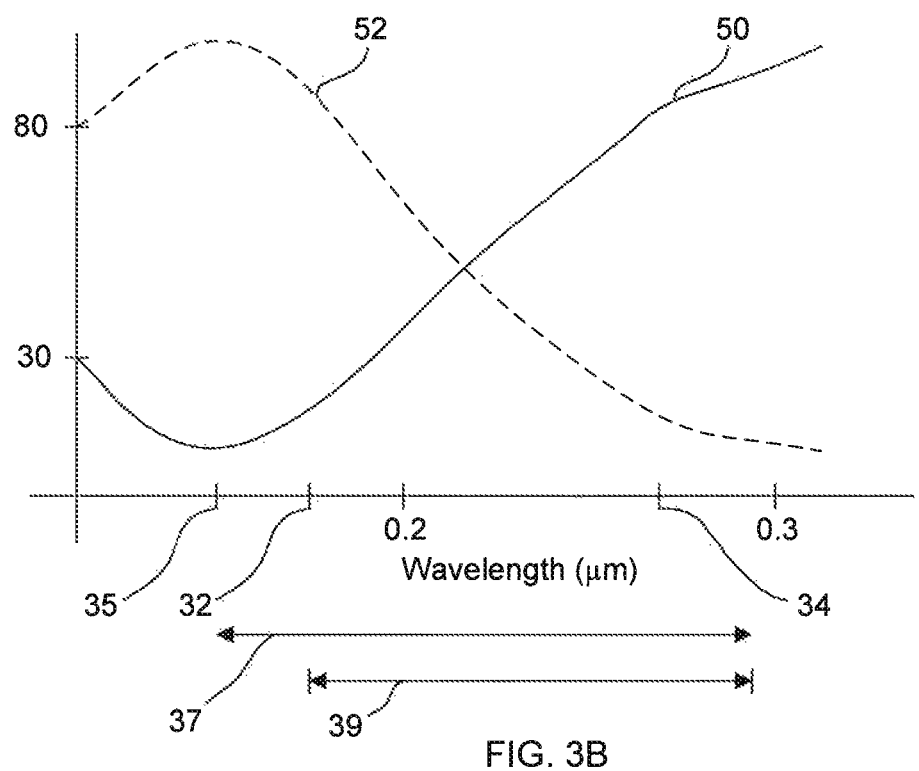
FIG. 3B is a portion of the plot of UV Transmission percentage of FIG. 3A.

FIG. 3A illustrates a transmission ratio 50 of light through the fingerprint 16 material versus wavelength. As shown in FIG. 3A, the transmission ratio may be relatively high (i.e., above 80%) for wavelengths greater than a first absorption threshold wavelength 34 and decreases for wavelengths less than the first absorption threshold wavelength 34. FIG. 3B illustrates the transmission ratio 50 of the light through the fingerprint 16 material for wavelengths less than 300 nm, including the absorption threshold wavelength 34. The coating 42 of the mirrors 38, 40 may be selected to filter out wavelengths from the light 13 that are greater than the first absorption threshold wavelength 34, in order to minimize the transmission ratio 50 through the fingerprint 16 material and thus maximize the absorption. As illustrated in FIG. 3B, the transmission ratio 50 may be minimized at a second absorption threshold wavelength 35, below which the transmission ratio 50 increases. The coating 42 of the mirrors 38, 40 may be further selected to filter out wavelengths from the light 13 that are less than the second absorption threshold wavelength 35. In an non-limiting example, the second absorption threshold wavelength 35 is in a range of about 180 nm to about 200 nm. Thus, as illustrated in FIG. 3B, an initial wavelength range 37 of the light between the first absorption threshold wavelength 34 and second absorption threshold wavelength 35 may be used, thereby minimizing the transmission ratio 50 of the light 13 through the fingerprint 16 material. In an non-limiting example, the first absorption threshold wavelength 34 may be in a range of approximately 180-200 nm. In an non-limiting example, the first absorption threshold wavelength 34 may be approximately 195 nm. However, the first absorption threshold wavelength is not limited to any specific range of wavelength.

FIG. 3B also illustrates a contrast 52 of an image of the fingerprint 16 versus wavelength. As shown in FIG. 3B, the contrast 52 of the image of the fingerprint 16 may have an inverse relationship with the transmission ratio 50, such that the contrast 52 is maximized at the second absorption threshold wavelength 35, and decreases at wavelengths less than and greater than the second absorption threshold wavelength 35. Thus, the contrast 52 curve confirms that the wavelength of the light source 12 may be selected to be within the wavelength range 37 between the second absorption threshold wavelength 35 and the first absorption threshold wavelength 34, to simultaneously maximize the absorption of the light 13 by the fingerprint 16 material and maximize the image contrast 52 of the fingerprint 16 on the sample surface 14. Furthermore, the contrast 52 curve indicates that the contrast 52 of the image of the fingerprint 16 material is limited by the largest wavelength within the wavelength range 37.

Figure 3C:
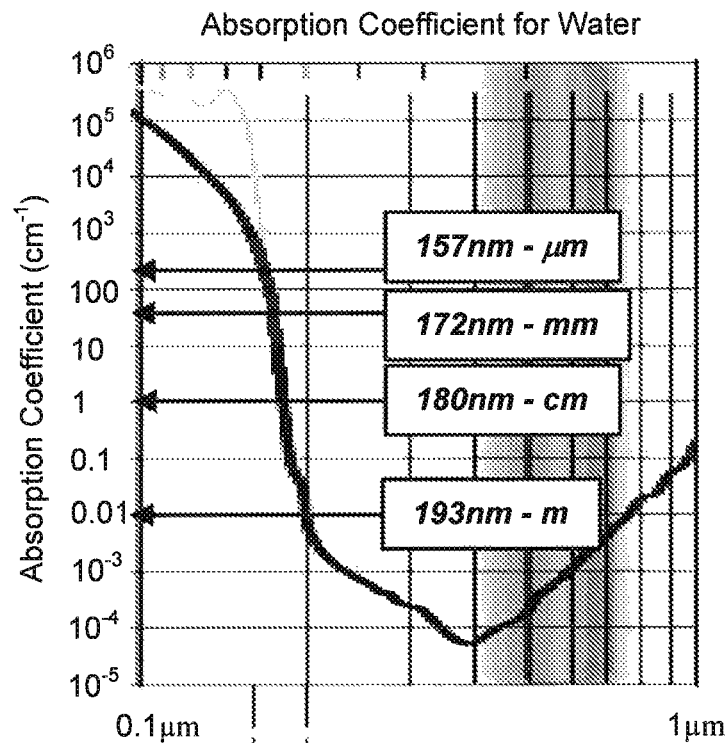
FIG. 3C is a plot of an absorption coefficient versus wavelength for the light source of FIG. 1 through atmosphere.
Figure 4:
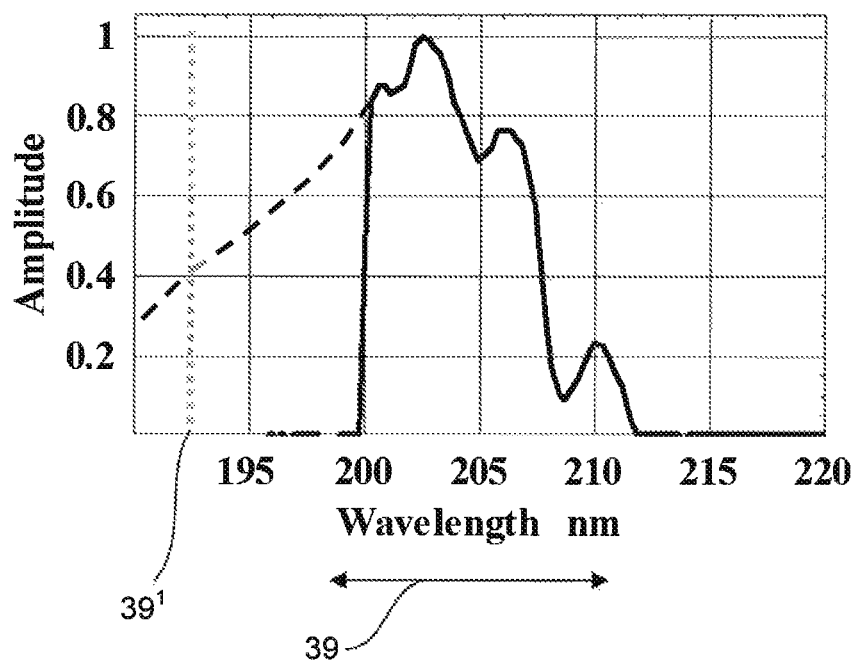
FIG. 4 is a plot of the wavelength of the filtered light source in the system of FIG. 1.

FIG. 3C illustrates a plot of an absorption coefficient of the light 13 through the atmosphere (i.e., water vapor). As appreciated by one skilled in the art, the absorption coefficient of the light 13 at a specific wavelength through the atmosphere may be inversely proportional to the propagation distance at which the light 13 at that wavelength can travel through the atmosphere. As illustrated in FIG. 3C, for wavelengths greater than a propagation threshold wavelength 32, the absorption coefficient may be sufficiently low so that the propagation distance of the light 13 is sufficiently high to be greater than a maximum distance 33 (FIG. 1) of the light source 12 from the sample surface 14 in the system 10. Thus, in order for the light 13 to be capable of propagating between the light source 12 and the sample surface 14 in the system 10, the wavelength of the light source 12 is further filtered to be greater than the propagation threshold wavelength 32. As discussed above, the wavelength of the light 13 was initially selected to be within an initial wavelength range 37, based on the transmission ratio 50 of the light 13 through the fingerprint 16 material. In addition, as illustrated in FIG. 3B, the wavelength of the light 13 is further selected to be within a wavelength range 39 that includes, those wavelengths of the wavelength range 37 that are greater than the propagation threshold wavelength 32. Thus, by adjusting the coating 42 on the mirrors 38, 40, so that the wavelength range 39 of the light 13 is incident on the sample surface 14, the light 13 will propagate between the light source 12 and the sample surface 14, will be mostly absorbed by the fingerprint 16 material, and will have sufficient image contrast when the fingerprint 16 image is generated by the system 10. As illustrated in FIG. 3C, a range of the propagation threshold wavelength 32 is depicted. In an non-limiting example, the range of the propagation threshold wavelength 32 may be in a range of approximately 160-180 nm. As shown in FIG. 3C, light 13 at a wavelength of 157 nm may have an absorption coefficient of 200 cm$^{-1}$ such that the propagation distance is on the order of microns. As shown in FIG. 3C, light 13 at a wavelength of 172 nm has an absorption coefficient of 15 cm$^{-1}$ such that the propagation distance is on the order of millimeters. As shown in FIG. 3C, light 13 at a wavelength of 180 nm may have an absorption coefficient of 1 cm$^{-1}$ such that the propagation distance is on the order of centimeters. As shown in FIG. 3C, light 13 at a wavelength of 193 nm may have an absorption coefficient of 0.01 cm$^{-1}$ such that the propagation distance is on the order of meters. As illustrated in FIG. 4, the wavelength range 39 of the light source 12 (flash lamp) may be selected to be within a range of approximately 200-213 nm, in an non-limiting example. In an non-limiting example, the wavelength range 39 of the light source 12 may be selected to be at approximately 206 nm. As further illustrated in FIG. 4, an alternate wavelength range 39' of an alternate light source, such as an argon fluoride (ArF) laser, is selected to be at approximately 193 nm, in an non-limiting example.

Figure 3D:
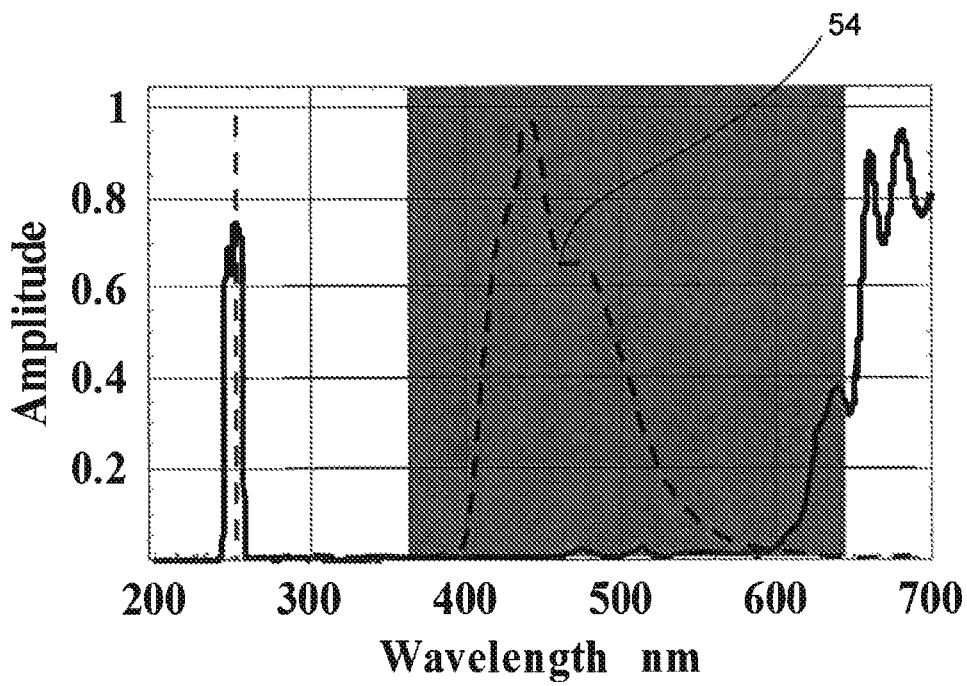
FIG. 3D is a plot of fluorescence of the sample surface of FIG. 2 versus wavelength.

As discussed above, the wavelength of the light 13 may be selected to fall within the wavelength range 39, such that the light 13 is mostly absorbed by the fingerprint 16 material and is absorbed by the gap portions 22 of the sample surface 14 (FIG. 2). The gap portions 22 of the sample surface 14 fluoresce, while the fingerprint 16 material and the ridge portions 26 of the surface 14 below the fingerprint 16 material do not fluoresce, or fluoresce at a much smaller rate than the gap portions 22. FIG. 3D illustrates a plot of the fluorescence spectrum 54 of the gap portions 22 of the sample surface 14, which includes a peak visible wavelength in a blue-green portion of the visible spectrum. However, the system 10 is not dependent on the gap portions 22 to fluoresce at any particular spectrum. In an embodiment, the fluorescence spectrum 54 of the gap portions 22 of the sample surface 14 in FIG. 3D is based on the sample surface being a paper surface, such as white/copy paper.

Figure 5:
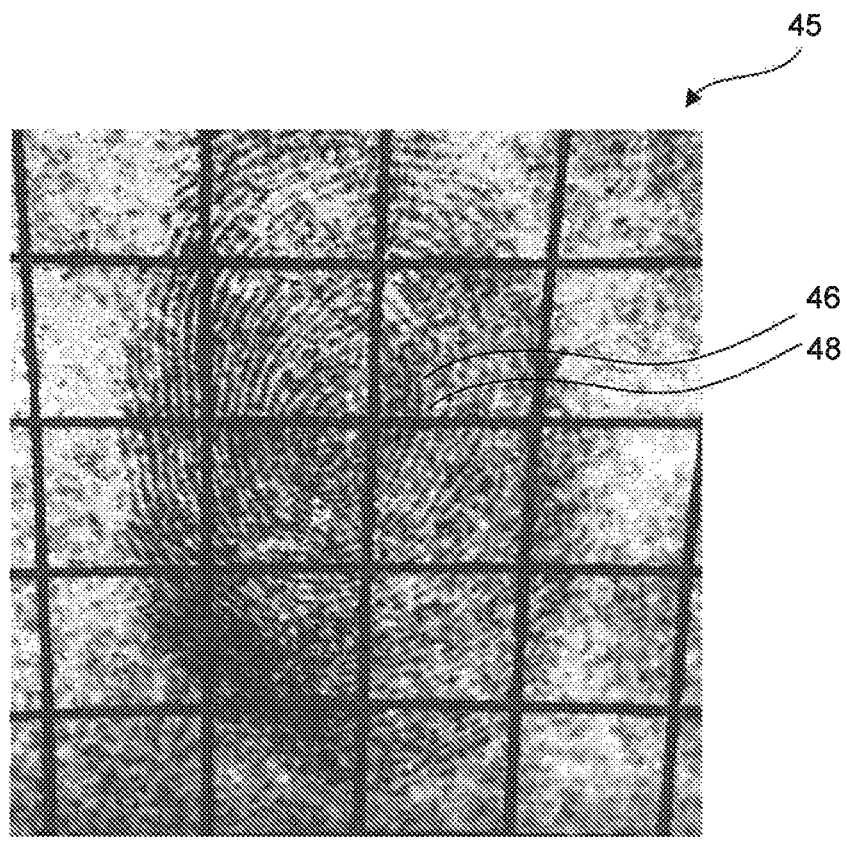
FIG. 5 is a plan view of an image of the fingerprint on the sample surface captured by the system of FIG. 1.

The optical detector 18 may be arranged relative to the light source 12 such that the optical detector 18 captures fluorescence instantaneously upon illumination of the sample surface 14 at the ambient temperature from the gap portions 22 of the sample surface 14 between ridges 24 of the latent fingerprint 16. The optical detector 18 may exclusively use the fluorescence spectrum 54 from the gap portions 22 to generate image data of the latent fingerprint 16 on the sample surface 14. In an non-limiting example, instantaneously means within 5 seconds, and more preferably, within 1 second, of the illumination of the sample surface 14 at the ambient temperature, for purposes of this embodiment. In an non-limiting example, the sample surface 14 and the latent fingerprint 16 material on the sample surface 14 remain at the ambient temperature, throughout the capture of fluorescence by the optical detector 18. The image processor 28 (FIG. 1) may be connected to the optical detector 18 and receives the image data from the optical detector 18. The image processor 28 then analyzes the generated image data to generate an image 45 (FIG. 5) of the fingerprint 16 on the sample surface 14. The image processor 28 may then verify that the contrast 52 of the image data used to form the image 45 exceeds a minimum contrast threshold. The image processor 28 may determine the contrast based on a ratio of an intensity of an image pixel 46 of the sample surface 14 between the ridges 24 of the fingerprint to an intensity of an image pixel 48 of the ridges 24 of the fingerprint. The image processor 28 then compares the image contrast to a signal to noise ratio (SNR) of the optical detector 18. The image processor 28 may then determine whether the image contrast exceeds the SNR, in order to determine whether the contrast exceeds a minimum contrast threshold. In an non-limiting example, the image processor 28 may determine whether the image contrast is at least twice the SNR, in order to confirm that the image contrast exceeds a minimum contrast threshold. However, the image processor 28 may use a different threshold than twice the SNR to confirm that the image contrast exceeds the minimum contrast threshold. Alternatively, the image processor 28 may include a memory 29 in which the contrast 52 (FIG. 3B) is stored for each wavelength within the wavelength range 39. In an non-limiting example, the image processor 28 may determine the image contrast of the image 45, by retrieving the stored contrast 52 for the wavelength within the wavelength range 39 that is used for the light source 12, and subsequently compare this retrieved contrast 52 with the SNR of the optical detector 18, in order to determine whether the image contrast exceeds a minimum contrast threshold.

Figure 6:
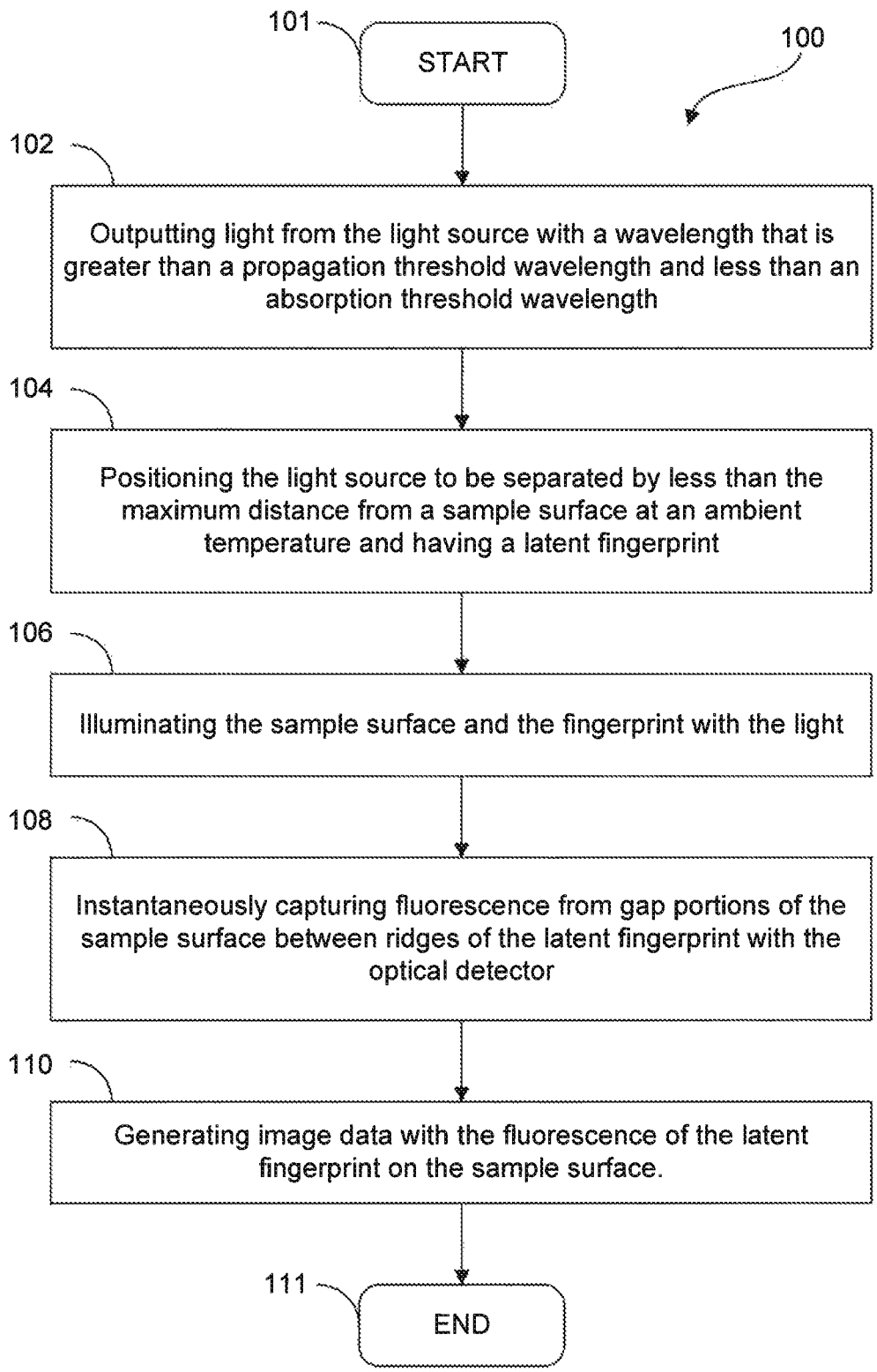
FIG. 6 is a flowchart depicting a method for imaging latent fingerprints as described herein.

FIG. 6 shows a flowchart depicting a method 100 for imaging latent fingerprints 16. The method 100 may begin at 101 by outputting 102 light 13 from the light source 12 with a wavelength that is greater than a propagation threshold wavelength 32 such that the light 13 can propagate a maximum distance and less than an absorption threshold wavelength 34 such that most of the light 13 is absorbed by fingerprint 16 material. The method 100 may further include positioning 104 the light source 12 to be separated by less than the maximum distance from a sample surface 14 at an ambient temperature and having a raw latent fingerprint 16. The method 100 may further include illuminating 106 the sample surface 14 and the fingerprint 16 with the light 13. The method 100 may further include instantaneously capturing 108 fluorescence 54 from gap portions 22 of the sample surface 14 between ridges 24 of the latent fingerprint 16 with the optical detector 18. The method 100 may further include generating 110 image data with the fluorescence 54 of the latent fingerprint 16 on the sample surface 14, before ending at 111.

While various disclosed embodiments have been described above, it should be understood that they have been presented by way of non-limiting examples only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

The embodiments being thus described, it will be obvious that the same may be varied in many ways. Such variations are not to be regarded as departure from the spirit and scope of the embodiments, and all such modifications as would be obvious to one skilled in the art are intended to be included within the scope of the following claims.

The invention claimed is:

1. A latent fingerprint imaging system, comprising:
a light source that illuminates a sample surface having a raw latent fingerprint, wherein the sample surface is at an ambient temperature;
an optical detector arranged relative to the light source to capture fluorescence instantaneously upon illumination of the sample surface at the ambient temperature from gap portions of the sample surface between ridges of the latent fingerprint and to use the fluorescence from the gap portions to generate image data of the latent fingerprint on the sample surface; and
wherein light from the light source has a wavelength that is greater than a propagation threshold wavelength such that the light is configured to propagate from the light source to the sample surface, and wherein the wavelength is less than an absorption threshold wavelength such that the light is mostly absorbed by material of the latent fingerprint on the sample surface.

2. The system of claim 1, further comprising an image processor that analyzes said generated image data to verify that a contrast of the image data exceeds a minimum contrast threshold.

3. The system of claim 1, where the optical detector is aligned normal to said sample surface and wherein said light source is aligned at a non-normal angle to said sample surface.

4. The system of claim 1, wherein said light source is one of a flash lamp and a laser.

5. The system of claim 4, further comprising:
at least one mirror with a reflective coating to filter out wavelengths from the flash lamp other than wavelengths greater than the propagation threshold wavelength and less than the absorption threshold wavelength; and
a baffle configured to reduce scattering of the filtered wavelengths of light from the at least one mirror incident on the sample surface.

6. The system of claim 1, wherein the propagation threshold wavelength is in a range of approximately 160-180 nm, and wherein the absorption threshold wavelength is in a range of approximately 180-200 nm.

7. The system of claim 6, wherein the wavelength is in a range of approximately 200-213 nm.

8. The system of claim 6, wherein the wavelength is approximately 193 nm.

9. The system of claim 2, wherein said image processor is configured to:
determine the contrast based on a ratio of an intensity of an image pixel of the sample surface between the ridges of the fingerprint to an intensity of an image pixel of the ridges of the fingerprint;
compare the image contrast to a signal to noise ratio (SNR) of the optical detector; and
determine whether the image contrast exceeds the minimum contrast threshold, based on the comparison of the image contrast with the SNR.

10. The system of claim 9, wherein the image processor is configured to determine that the image contrast exceeds the minimum contrast threshold, based on the image contrast being at least twice the SNR of the optical detector.

11. A latent fingerprint imaging system, comprising:
a light source configured to output light with a wavelength that is greater than a propagation threshold wavelength such that the light can propagate a maximum distance and less than an absorption threshold wavelength such that most of the light is absorbed by fingerprint material;
wherein the light source is positioned to illuminate a sample surface having a raw latent fingerprint with the light, said sample surface separated from the light source by a distance that is less than the maximum distance; and
an optical detector arranged relative to the light source such that the optical detector captures fluorescence from gap portions of the sample surface between ridges of the latent fingerprint and uses the fluorescence of the gap portions to generate image data of the latent fingerprint on the sample surface.

12. The system of claim 11, wherein the sample surface is at an ambient temperature during the capture of fluorescence from the sample surface by the optical detector.

13. The system of claim 11, further comprising an image processor that analyzes said generated image data to verify that a contrast of the image data exceeds a minimum contrast threshold.

14. The system of claim 11, where the optical detector is aligned approximately normal to said sample surface and wherein said light source is aligned at a non-normal angle to said sample surface.

15. The system of claim 11, wherein the propagation threshold wavelength is in a range of approximately 160-180 nm, and wherein the absorption threshold wavelength is in a range of approximately 180-200 nm.

16. The system of claim wherein the light source is a flash lamp, said system further comprising:
at least one mirror with a reflective coating to filter out wavelengths from the flash lamp other than wavelengths greater than the propagation threshold wavelength and less than the absorption threshold wavelength; and a baffle configured to reduce scattering of the filtered wavelengths of the light from the at least one mirror incident on the sample surface.

17. A method for imaging latent fingerprints, comprising:

outputting light from a light source with a wavelength that is greater than a propagation threshold wavelength such that the light can propagate a maximum distance and less than an absorption threshold wavelength such that most of the light is absorbed by fingerprint material;

positioning the light source to be separated by less than the maximum distance from a sample surface at an ambient temperature and having a raw latent fingerprint;

illuminating the sample surface and the fingerprint with the light;

instantaneously capturing fluorescence from gap portions of the sample surface between ridges of the latent fingerprint with an optical detector; and generating image data with the fluorescence of the latent fingerprint on the sample surface.

18. The method of claim 17, further comprising analyzing said generated image data to verify that a contrast of the image data exceeds a minimum contrast threshold with an image processor.

19. The method of claim 17, further comprising:

filtering out wavelengths from the light source other than wavelengths greater than the propagation threshold wavelength and less than the absorption threshold wavelength with at least one mirror; and reducing scattering of the filtered wavelengths of light from the at least one mirror incident on the sample surface.

20. The method of claim 18, wherein said analyzing step comprises:

determining the contrast based on a ratio of an intensity of an image pixel of the sample surface between the ridges of the fingerprint to an intensity of an image pixel of the ridges of the fingerprint;

comparing the image contrast to a signal to noise ratio (SNR) of the optical detector;

determining whether the image contrast exceeds the minimum contrast threshold, based on the comparison of the image contrast with the SNR.

* * * * *

UNITED STATES PATENT AND TRADEMARK OFFICE
CERTIFICATE OF CORRECTION

| | | Page 1 of 1 |
|---|---|---|
| PATENT NO. | : 8,774,613 B1 | |
| APPLICATION NO. | : 14/210996 | |
| DATED | : July 8, 2014 | |
| INVENTOR(S) | : Edward J. Miesak | |

It is certified that error appears in the above-identified patent and that said Letters Patent is hereby corrected as shown below:

In the Claims

Column 8, line 64 (claim 16, line 1), after "claim" insert --11,--.

Signed and Sealed this
Thirtieth Day of September, 2014

Michelle K. Lee
*Deputy Director of the United States Patent and Trademark Office*